UNITED STATES PATENT OFFICE.

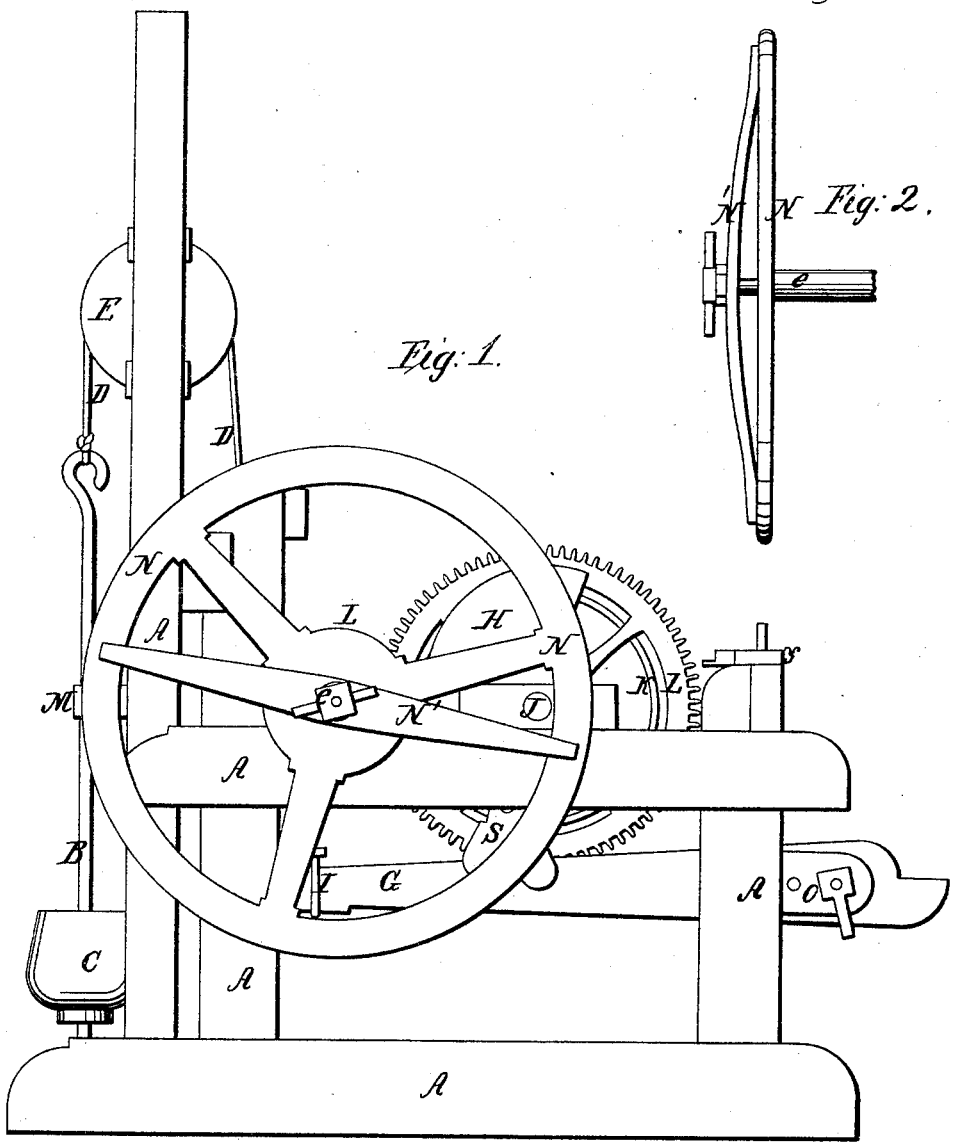

ABRAM C. FREDERICK, OF CLARENDON, NEW YORK.

MECHANICAL MOVEMENTS FOR REGULATING THE ACTION OF A FLY-WHEEL ON THE WORKING PARTS OF MACHINERY CONNECTED WITH IT.

Specification of Letters Patent No. 18,734, dated December 1, 1857.

*To all whom it may concern:*

Be it known that I, ABRAM C. FREDERICK, of Clarendon, in the county of Orleans and State of New York, have invented a new and useful Device for Regulating the Action of Fly-Wheels upon the Working Parts of Machinery, the construction and operation of which I have described in the following specification and illustrated in the accompanying drawings with sufficient clearness to enable competent and skilful workmen in the arts to which it pertains or is most nearly allied to make and use my invention.

It very often happens in machines for drilling rocks, and sometimes in machinery for other purposes, that while the use of the balance wheel is very desirable, and perhaps in some instances indispensible, that the working parts are liable to be arrested in their action by some obstruction, and are then liable to be broken by the accumulated force or inertia of the fly wheel.

My said invention consists in attaching a balance or fly wheel to the machinery upon which it is intended to concentrate its force, by the medium of a friction brake in such a manner that it can only apply a sufficient amount of force to the working parts, no matter what may be its weight or velocity.

The accompanying drawings represent my invention applied to a machine for drilling rocks, in which—

Figure 1 is a side elevation of the machine with my improvement. Fig. 2 is an edge elevation of the fly wheel, brake, and axle showing more clearly the mode of attaching the brake so as to produce the effect stated.

A is the frame.

B is the drill, C the weight which gives it effective force, and D is a cord attached to the drill bar B and passing over the pulley E which is hung in an adjustable slide frame sliding within the upright portion of the frame A.

The slide frame and pulley are adjusted by means of a set screw placed either above or below the said slide frame. The opposite end of the cord D is attached to the working beam G by the stirrup I. Motion is given to this beam by means of the cam H upon the shaft J which is operated by the driving wheel K. The uniform motion requisite to operate this machine in which the power is so unequally applied, and which is liable to be suddenly stopped is provided by the gearing L L', and the adjustable balance friction wheel N. This balance wheel N is not fixed unmovably upon its shaft $c$ the shaft being round and the wheel fitted but not keyed to it and kept in place by the adjustable friction spring bar N'.

When the machine is brought to the proper place for operation, and the drill adjusted in the guide M; motion is given to the shaft J by any desirable power, applied in the ordinary way; and the cam H upon the shaft J strikes the roller S and through it gives to the beam G which is hung in brackets at O a vertical motion, and thus by the cord D operating the drill. At the same time motion is communicated to the shaft of the balance wheel by the gearing before named, which wheel acts as a regulator of the motion and of the power applied in operating the drill. The drill is however liable to be caught in the rock upon which it is operating, and if the whole accumulated force of the balance or fly wheel was then thrown upon it, some part of the machinery must yield to the unequal pressure. The arrangement described obviates this difficulty by limiting the force which the inertia of the balance or fly wheel may give to the working parts; for in case the machine is suddenly stopped the fly wheel can only communicate so much power as is due to the friction which retards its revolution upon the shaft, and it is thus allowed to revolve without the same motion of the shaft when it would otherwise break the machine.

The particular improvement which constitutes my said invention and which I claim as having been originally and first invented by me is—

Attaching a fly wheel to the machinery upon which it is intended to concentrate its force, by the medium of a friction brake substantially as and for the purpose set forth.

ABRAM C. FREDERICK.

Witnesses:
M. D. SNYDER,
E. S. REED.